US007689311B2

(12) United States Patent
Ruml et al.

(10) Patent No.: US 7,689,311 B2
(45) Date of Patent: Mar. 30, 2010

(54) MODEL-BASED PLANNING USING QUERY-BASED COMPONENT EXECUTABLE INSTRUCTIONS

(75) Inventors: Wheeler Ruml, Palo Alto, CA (US); Robert M. Lofthus, Webster, NY (US); Minh Binh Do, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 314 days.

(21) Appl. No.: 11/807,478

(22) Filed: May 29, 2007

(65) Prior Publication Data

US 2008/0300708 A1 Dec. 4, 2008

(51) Int. Cl.
*G06F 19/00* (2006.01)
*G06F 7/60* (2006.01)
*G06F 17/10* (2006.01)
*G06F 9/46* (2006.01)

(52) U.S. Cl. .................. 700/103; 700/100; 700/105; 703/2; 718/104

(58) Field of Classification Search .............. 700/97, 700/99–101, 103, 105; 703/1, 2; 705/7–9, 705/28; 706/46, 16, 19; 707/3; 718/102–104, 718/100
See application file for complete search history.

(56) References Cited

U.S. PATENT DOCUMENTS

| 4,579,446 A | 4/1986 | Fujino et al. |
| 4,587,532 A | 5/1986 | Asano |
| 4,836,119 A | 6/1989 | Siraco et al. |
| 5,004,222 A | 4/1991 | Dobashi |
| 5,008,713 A | 4/1991 | Ozawa et al. |
| 5,080,340 A | 1/1992 | Hacknauer et al. |
| 5,095,342 A | 3/1992 | Farrell et al. |
| 5,159,395 A | 10/1992 | Farrell et al. |
| 5,208,640 A | 5/1993 | Horie et al. |
| 5,272,511 A | 12/1993 | Conrad et al. |
| 5,326,093 A | 7/1994 | Sollitt |
| 5,432,887 A * | 7/1995 | Khaw .................. 706/19 |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner*—Crystal J Barnes-Bullock
(74) *Attorney, Agent, or Firm*—Fay Sharpe LLP

(57) ABSTRACT

A method for planning machine control for a system includes determining one or more capabilities and one or more capability constraints for each component used to execute a plan for processing a job by the system. The plan is incrementally constructed based on the components, the one or more capabilities, and the one or more constraints. One or more sets of executable instructions are queried with incremental portions of the plan, wherein each set of executable instructions is associated with a different one of the components and represents the actions that are performed by its corresponding component, each incremental portion includes actions that are to be performed by its corresponding component, and each set of executable instructions executes the incremental portion it received. Upon receiving confirmation from each of the queried sets of executable instructions that indicates each of the components is able to perform the actions in the incremental portions, a final plan for processing the job is generated.

20 Claims, 3 Drawing Sheets

U.S. PATENT DOCUMENTS

| | | |
|---|---|---|
| 5,435,544 A | 7/1995 | Mandel |
| 5,473,419 A | 12/1995 | Russel et al. |
| 5,489,969 A | 2/1996 | Soler et al. |
| 5,504,568 A | 4/1996 | Saraswat et al. |
| 5,525,031 A | 6/1996 | Fox |
| 5,557,367 A | 9/1996 | Yang et al. |
| 5,568,246 A | 10/1996 | Keller et al. |
| 5,570,172 A | 10/1996 | Acquaviva |
| 5,596,416 A | 1/1997 | Barry et al. |
| 5,629,762 A | 5/1997 | Mahoney et al. |
| 5,671,338 A * | 9/1997 | Araki et al. ............... 706/46 |
| 5,710,968 A | 1/1998 | Clark et al. |
| 5,778,377 A | 7/1998 | Marlin et al. |
| 5,884,910 A | 3/1999 | Mandel |
| 5,995,721 A | 11/1999 | Rourke et al. |
| 6,059,284 A | 5/2000 | Wolf et al. |
| 6,125,248 A | 9/2000 | Moser |
| 6,241,242 B1 | 6/2001 | Munro |
| 6,243,611 B1 * | 6/2001 | Hazama et al. ............... 700/97 |
| 6,297,886 B1 | 10/2001 | Cornell |
| 6,341,773 B1 | 1/2002 | Aprato et al. |
| 6,384,918 B1 | 5/2002 | Hubble, III et al. |
| 6,450,711 B1 | 9/2002 | Conrow |
| 6,476,376 B1 | 11/2002 | Biegelsen et al. |
| 6,476,923 B1 | 11/2002 | Cornell |
| 6,493,098 B1 | 12/2002 | Cornell |
| 6,537,910 B1 | 3/2003 | Burke et al. |
| 6,550,762 B2 | 4/2003 | Stoll |
| 6,554,276 B2 | 4/2003 | Jackson et al. |
| 6,577,925 B1 | 6/2003 | Fromherz |
| 6,607,320 B2 | 8/2003 | Bobrow et al. |
| 6,608,988 B2 | 8/2003 | Conrow |
| 6,612,566 B2 | 9/2003 | Stoll |
| 6,612,571 B2 | 9/2003 | Rider |
| 6,621,576 B2 | 9/2003 | Tandon et al. |
| 6,633,382 B2 | 10/2003 | Hubble, III et al. |
| 6,639,669 B2 | 10/2003 | Hubble, III et al. |
| 6,738,736 B1 * | 5/2004 | Bond ............... 703/2 |
| 6,819,906 B1 | 11/2004 | Herrmann et al. |
| 6,856,845 B2 | 2/2005 | Fromherz et al. |
| 6,895,292 B2 * | 5/2005 | Fromherz et al. ......... 700/101 |
| 6,925,283 B1 | 8/2005 | Mandel et al. |
| 6,959,165 B2 | 10/2005 | Mandel et al. |
| 6,959,327 B1 * | 10/2005 | Vogl et al. ............... 709/219 |
| 6,973,286 B2 | 12/2005 | Mandel et al. |
| 7,024,152 B2 | 4/2006 | Lofthus et al. |
| 7,123,873 B2 | 10/2006 | deJong et al. |
| 7,162,172 B2 | 1/2007 | Grace et al. |
| 7,188,929 B2 | 3/2007 | Lofthus |
| 7,206,532 B2 | 4/2007 | Lofthus et al. |
| 7,206,536 B2 | 4/2007 | Julien |
| 7,313,534 B2 * | 12/2007 | Scheer ............... 705/9 |
| 2002/0069099 A1 * | 6/2002 | Knox et al. ............... 705/8 |
| 2002/0078012 A1 | 6/2002 | Ryan et al. |
| 2002/0103559 A1 | 8/2002 | Gartstein |
| 2002/0156795 A1 | 10/2002 | Edwards et al. |
| 2003/0061012 A1 * | 3/2003 | Orr et al. ............... 703/1 |
| 2003/0077095 A1 | 4/2003 | Conrow |
| 2003/0139983 A1 * | 7/2003 | Spencer et al. ............... 705/28 |
| 2004/0024787 A1 | 2/2004 | Edwards et al. |
| 2004/0085561 A1 | 5/2004 | Fromherz |
| 2004/0085562 A1 | 5/2004 | Fromherz |
| 2004/0088207 A1 | 5/2004 | Fromherz |
| 2004/0150156 A1 | 8/2004 | Fromherz et al. |
| 2004/0150158 A1 | 8/2004 | Biegelsen et al. |
| 2004/0153983 A1 | 8/2004 | McMillan |
| 2004/0199865 A1 * | 10/2004 | Bie et al. ............... 715/500 |
| 2004/0216002 A1 | 10/2004 | Fromherz et al. |
| 2004/0225391 A1 | 11/2004 | Fromherz et al. |
| 2004/0225394 A1 | 11/2004 | Fromherz et al. |
| 2004/0247365 A1 | 12/2004 | Lofthus et al. |
| 2005/0210010 A1 * | 9/2005 | Larson et al. ............... 707/3 |
| 2006/0066885 A1 | 3/2006 | Anderson et al. |
| 2006/0067756 A1 | 3/2006 | Anderson et al. |
| 2006/0067757 A1 | 3/2006 | Anderson et al. |
| 2006/0114313 A1 | 6/2006 | Moore |
| 2006/0114497 A1 | 6/2006 | Anderson et al. |
| 2006/0115287 A1 | 6/2006 | Roof |
| 2006/0115288 A1 | 6/2006 | Roof |
| 2006/0132815 A1 | 6/2006 | Lofthus et al. |
| 2006/0176336 A1 | 8/2006 | Moore et al. |
| 2006/0197966 A1 | 9/2006 | Viturro et al. |
| 2006/0209101 A1 | 9/2006 | Mizes |
| 2006/0214359 A1 | 9/2006 | Clark |
| 2006/0214364 A1 | 9/2006 | Clark et al. |
| 2006/0215240 A1 | 9/2006 | Mongeon |
| 2006/0221159 A1 | 10/2006 | Moore et al. |
| 2006/0221362 A1 | 10/2006 | Julien et al. |
| 2006/0222384 A1 | 10/2006 | Moore et al. |
| 2006/0222393 A1 | 10/2006 | de Jong et al. |
| 2006/0227350 A1 | 10/2006 | Crawford et al. |
| 2006/0230201 A1 | 10/2006 | Fromherz et al. |
| 2006/0230403 A1 | 10/2006 | Crawford et al. |
| 2006/0233569 A1 | 10/2006 | Furst et al. |
| 2006/0235547 A1 | 10/2006 | Hindi et al. |
| 2006/0238778 A1 | 10/2006 | Mongeon et al. |
| 2006/0242648 A1 * | 10/2006 | Guccione et al. ............ 718/105 |
| 2006/0244980 A1 | 11/2006 | Grace |
| 2006/0250636 A1 | 11/2006 | Richards |
| 2006/0268317 A1 | 11/2006 | Lofthus et al. |
| 2006/0268318 A1 | 11/2006 | Lofthus et al. |
| 2006/0269310 A1 | 11/2006 | German et al. |
| 2006/0274334 A1 | 12/2006 | Mongeon |
| 2006/0274337 A1 | 12/2006 | Dalal et al. |
| 2006/0280517 A1 | 12/2006 | Roof et al. |
| 2006/0285159 A1 | 12/2006 | Frankel |
| 2006/0285857 A1 | 12/2006 | Swift |
| 2007/0002085 A1 | 1/2007 | Sampath et al. |
| 2007/0002344 A1 | 1/2007 | Klassen |
| 2007/0002403 A1 | 1/2007 | Klassen |
| 2007/0024894 A1 | 2/2007 | Moore et al. |
| 2007/0031170 A1 | 2/2007 | deJong et al. |
| 2007/0041745 A1 | 2/2007 | Dalal et al. |
| 2007/0052991 A1 | 3/2007 | Goodman et al. |
| 2007/0081064 A1 | 4/2007 | Spencer et al. |
| 2007/0081828 A1 | 4/2007 | Radulski et al. |
| 2008/0148257 A1 * | 6/2008 | Ruml et al. ............... 718/100 |

OTHER PUBLICATIONS

Desmond Fretz, "Cluster Printing Solution Announced", Today at Xerox (TAX), No. 1129, Aug. 3, 2001.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,450, filed Nov. 30, 2004, Lofthus et al.
U.S. Appl. No. 11/000,168, filed Nov. 30, 2004, Biegelsen et al.
U.S. Appl. No. 11/109,566, filed Apr. 19, 2005, Mandel et al.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/215,791, filed Aug. 30, 2005, Hamby et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/287,177, filed Nov. 23, 2005, Mandel et al.
U.S. Appl. No. 11/291,583, filed Nov. 30, 2005, Lang.
U.S. Appl. No. 11/291,860, filed Nov. 30, 2005, Willis.
U.S. Appl. No. 11/274,638, filed Nov. 15, 2005, Wu et al.
U.S. Appl. No. 11/287,685, filed Nov. 28, 2005, Carolan.
U.S. Appl. No. 11/317,589, filed Dec. 23, 2005, Biegelsen et al.
U.S. Appl. No. 11/314,774, filed Dec. 21, 2005, Klassen.

U.S. Appl. No. 11/317,167, filed Dec. 23, 2005, Lofthus et al.
U.S. Appl. No. 11/314,828, filed Dec. 21, 2005, Anderson et al.
U.S. Appl. No. 11/292,388, filed Nov. 30, 2005, Mueller.
U.S. Appl. No. 11/292,163, filed Nov. 30, 2005, Mandel et al.
U.S. Appl. No. 11/312,081, filed Dec. 20, 2005, Mandel et al.
U.S. Appl. No. 11/331,627, filed Jan. 13, 2006, Moore.
U.S. Appl. No. 11/341,733, filed Jan. 27, 2006, German.
U.S. Appl. No. 11/359,065, filed Feb. 22, 2005, Banton.
U.S. Appl. No. 11/349,828, filed Feb. 8, 2006, Banton.
U.S. Appl. No. 11/364,685, filed Feb. 28, 2006, Hindi et al.
U.S. Appl. No. 11/363,378, filed Feb. 27, 2006, Anderson et al.
U.S. Appl. No. 11/378,046, filed Mar. 17, 2006, Rizzolo et al.
U.S. Appl. No. 11/378,040, filed Mar. 17, 2006, German.
U.S. Appl. No. 11/403,785, filed Apr. 13, 2006, Banton et al.
U.S. Appl. No. 11/399,100, filed Apr. 6, 2006, Paul.
U.S. Appl. No. 11/417,411, filed May 4, 2006, DeGruchy.
U.S. Appl. No. 11/432,924, filed May 12, 2006, Lieberman et al.
U.S. Appl. No. 11/432,905, filed May 12, 2006, Mongeon et al.
U.S. Appl. No. 11/432,993, filed May 12, 2006, Anderson.
U.S. Appl. No. 11/487,206, filed Jul. 14, 2006, Wu et al.
U.S. Appl. No. 11/485,870, filed Jul. 13, 2006, Moore.
U.S. Appl. No. 11/474,247, filed Jun. 23, 2006, Moore.
U.S. Appl. No. 11/483,747, filed Jul. 6, 2006, Meetze.
U.S. Appl. No. 11/495,017, filed Jul. 28, 2006, Bean.
U.S. Appl. No. 11/501,654, filed Aug. 9, 2006, Mestha et al.
U.S. Appl. No. 11/522,171, filed Sep. 15, 2006, Sampath et al.
U.S. Appl. No. 11/528,770, filed Sep. 27, 2006, Degruchy.
U.S. Appl. No. 11/595,630, filed Nov. 9, 2006, Moore.
U.S. Appl. No. 11/590,432, filed Oct. 31, 2006, Moore.
U.S. Appl. No. 11/636,747, filed Dec. 11, 2006, Mestha et al.
U.S. Appl. No. 11/636,901, filed Dec. 11, 2006, Banton et al.
U.S. Appl. No. 11/639,073, filed Dec. 14, 2006, Biegelsen et al.
U.S. Appl. No. 11/643,119, filed Dec. 21, 2006, Clark et al.
U.S. Appl. No. 11/656,992, filed Jan. 23, 2007, Sampath et al.
U.S. Appl. No. 11/708,298, filed Feb. 20, 2007, Lang.
U.S. Appl. No. 11/714,016, filed Mar. 5, 2007, Furst.

* cited by examiner

MODEL-BASED PLANNING USING QUERY-BASED COMPONENT EXECUTABLE INSTRUCTIONS

BACKGROUND

Typically, a designer of a controller for a system (e.g., a machine, an apparatus, etc.) with modular hardware (e.g., components, modules, etc.) designs the control software for the system without knowing the configuration (e.g., capabilities, constraints of the capabilities, etc.) of one or more of the components that make up the system. If fact, such knowledge may not be attainable until after the control software is loaded to the system, system power is cycled "on," and the system boots up.

One technique that facilitates designing control software for such systems includes model-based planning. The model-based planning technique is based on a notion that each component of the system can send a model of its behavior to a central planner or controller. This assumes that a modeling language is available that can capture all the relevant information about each component's capabilities and constraints thereof and that the behavior of all possible future components can be captured as well. However, these assumptions typically are over-optimistic, or not achievable.

Conventionally, such models are written in a fixed language and transferred to the controller of the system. The controller interprets the models in order to determine the capabilities and constraints of the system components. Subsequently, upon receiving one or more jobs to process, the controller generates a plan to process the one or more jobs based on the components' capabilities and capability constraints described within each of the component models.

The plan is then validated via a propose/accept/confirm (PAC) protocol or other technique. With the PAC protocol, the plan is proposed to all of the components involved, as determined by the plan. Each of the components evaluates the proposed plan and responds to the controller by either accepting or rejecting the proposed plan. If all of the components accept the proposed plan, then the controller will confirm the plan. A confirmed plan is sent to an execution engine or the like for execution. If at least one of the components rejects the plan, then the controller generates a new plan, or re-plans. This cycle of generate a first plan, propose the first plan, reject the first plan, re-plan (generate a second plan), propose second plan, reject second plan, . . . , re-plan (generate plan X), propose plan X, etc. may continue until a plan is finally accepted by all of the components or be terminated without ever reaching a final plan.

By way of example, one or more of the component models may not capture one or more constraints of a component. Therefore, the controller may generate a plan that does not satisfy the unknown constraint and, thus, the plan is subsequently rejected by the corresponding component. Since the controller does not know why the plan was rejected (i.e., it is not aware of the constraint that is not being satisfied), the controller may generate a new or next plan that also does not satisfy the unknown constraint. As a result, the component will also reject this plan. Eventually, the controller may generate a plan that satisfies the unknown constraint and all of the components will accept the plan. However, the controller may never generate a plan that satisfies the unknown constraint and, thus, a plan may never by accepted by all of the components. In addition, each PAC cycle consumes time and cumulatively the time to get a confirmed plan may take tens, hundreds, thousands, etc. of milliseconds. Thus, even if a plan is eventually accepted, time and processing resources may have been wasted due to generating and testing plans based on the incomplete information.

In view of the above, there is an unresolved need for an improved planning technique.

CROSS REFERENCE TO RELATED PATENTS AND APPLICATIONS

The following applications, the disclosures of each being totally incorporated herein by reference are mentioned:

U.S. application Ser. No. 10/924,458, filed Aug. 23, 2004, entitled "PRINT SEQUENCE SCHEDULING FOR RELIABILITY," by Robert M. Lofthus, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. application Ser. No. 11/069,020, filed Feb. 28, 2004, entitled "PRINTING SYSTEMS," by Robert M. Lofthus, et al.;

U.S. application Ser. No. 11/102,899, filed Apr. 8, 2005, entitled "SYNCHRONIZATION IN A DISTRIBUTED SYSTEM," by Lara S. Crawford, et al.;

U.S. application Ser. No. 11/102,910, filed Apr. 8, 2005, entitled "COORDINATION IN A DISTRIBUTED SYSTEM," by Lara S. Crawford, et al.;

U.S. application Ser. No. 11/102,355, filed Apr. 8, 2005, entitled "COMMUNICATION IN A DISTRIBUTED SYSTEM," by Markus P. J. Fromherz, et al.;

U.S. application Ser. No. 11/102,332, filed Apr. 8, 2005, entitled "ON-THE-FLY STATE SYNCHRONIZATION IN A DISTRIBUTED SYSTEM," by Haitham A. Hindi;

U.S. application Ser. No. 11/122,420, filed May 5, 2005, entitled "PRINTING SYSTEM AND SCHEDULING METHOD," by Austin L. Richards;

U.S. application Ser. No. 11/136,959, filed May 25, 2005, entitled "PRINTING SYSTEMS," by Kristine A. German, et al.;

U.S. application Ser. No. 11/137,634, filed May 25, 2005, entitled "PRINTING SYSTEM," by Robert M. Lofthus, et al.;

U.S. application Ser. No. 11/137,251, filed May 25, 2005, entitled "SCHEDULING SYSTEM," by Robert M. Lofthus, et al.;

U.S. application Ser. No. 11/152,275, filed Jun. 14, 2005, entitled "WARM-UP OF MULTIPLE INTEGRATED MARKING ENGINES," by Bryan J. Roof, et al.;

U.S. application Ser. No. 11/156,778, filed Jun. 20, 2005, entitled "PRINTING PLATFORM," by Joseph A. Swift;

U.S. application Ser. No. 11/157,598, filed Jun. 21, 2005, entitled "METHOD OF ORDERING JOB QUEUE OF MARKING SYSTEMS," by Neil A. Frankel; and U.S. application Ser. No. 11/170,845, filed Jun. 30, 2005, entitled "HIGH AVAILABILITY PRINTING SYSTEMS," by Meera Sampath, et al.

BRIEF DESCRIPTION

In one aspect, a method for planning machine control for a system is illustrated. The method includes determining one or more capabilities and one or more capability constraints for each component used to execute a plan for processing a job by the system. The plan is incrementally constructed based on the components, the one or more capabilities, and the one or more constraints. One or more sets of executable instructions (e.g. a plug-in) are queried with incremental portions of the plan, wherein each set of executable instructions is associated with a different one of the components and represents the actions that are performed by its corresponding component, each incremental portion includes actions that are to be performed by its corresponding component, and each set of executable instructions executes the incremental portion it received. Upon receiving confirmation from each of the queried sets of executable instructions that indicates each of the components is able to perform the actions in the incremental portions, a final plan for processing the job is continually generated. Each set of executable instructions resides with its corresponding component or is mobile and is transferred to another component (e.g. where the plan generator locates).

DETAILED DESCRIPTION

Figure 1:
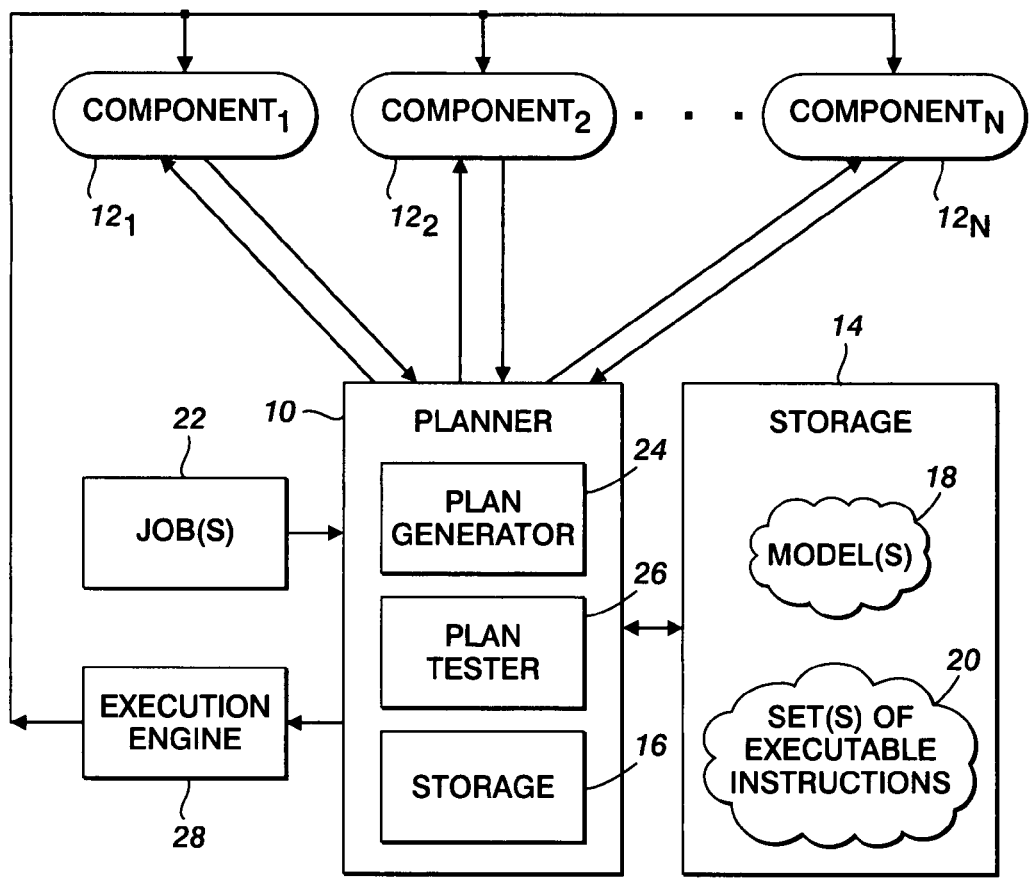
FIG. 1 illustrates an exemplary system with a planner that generates a plan for processing jobs by the system by confirming various portions of the plan can be processed by the components of the system prior to constructing and confirming a final plan.

With reference to FIG. 1, a system with a planner 10 that generates a plan(s) for processing a job(s) with the system is illustrated. The planner 10 generates a plan based on the capabilities of the system components and the constraints on these capabilities. During plan generation, the planner 10 tests (incremental) portions of the plan to ensure that the actions within portions satisfy the constraints of the components that will be performing the actions. Such testing can be achieved via a set of executable instructions (e.g., a plug-in) for each component. The set of executable instructions for a particular component represents the actions, bounded by any constraints, that that component can perform. Each set of executable instructions is queried with a proposed plan that includes the actions the corresponding component will perform. Upon validating the proposed plans for each component involved in the plan, a final plan is created and sent to the components that will execute the plan. The components individually either confirm the final plan (e.g., confirm that the involved components can process the job via the plan) or reject the final plan. The foregoing, unlike conventional techniques that only confirm the final plan, tests individual portions of the plan during plan construction to ensure that the individual portions of the plan satisfy the constraints of the components prior to generating the final plan.

The system, which can be a machine, an apparatus, a print platform, or the like, has modular hardware such as a component $12_1$, a component $12_2$, . . . and a component $12_N$, where N is an integer equal to or greater than one. Collectively, the components $12_1$, $12_2$ . . . and $12_N$, are referred to herein as components 12. Each of the components 12 is associated with one or more capabilities that can be used to process a job, and each capability is associated with one or more constraints. By way of non-limiting example, if the system were a multifunctional printing platform, the components 12 could include a paper feeder, a marking engine, a fuser, etc. Such fuser may have a capability of fusing images on print medium, and the fusing capability may be temperature and/or toner constrained. In another non-limiting example, the system can be a manufacturing system having components such as one or more presses, stampers, conveyors, etc. with individual capabilities and constraints on their capabilities. One or more of the conveyors may have a capability of transporting an item from one location to another location. This capability may be speed and/or weight constrained.

Each of the components 12 is associated with a model that describes its capabilities and constraints thereon (e.g., the actions it can perform and the limitations of the actions). Each model can be stored with its corresponding component 12, in a storage component of the system such as a storage component 14 or the like, in a storage component (not shown) external to the system, etc. The planner 10 is provided with access to each model. Such access typically includes at least read privileges. In instances in which the models are stored with the components 12 and/or in external storage, such access can be through a wire and/or wireless network, a bus, a port, a backplane, or the like. In another instance, each model can be provided to the planner 10 and stored locally within the planner in a storage component 16. In instances in which the planner 10 interprets the models, each model typically is written via a suitable language that can be interpreted by the planner 10. In instances in which the models are not interpreted by the planner 10, each model can be written in any language. For sake of brevity and clarity, FIG. 1 illustrates one or more models 18 as stored in the storage component 14. However, as described above, the one or more models 18 can be stored elsewhere and/or concurrently stored in multiple locations.

Each of the components 12 is also associated with a set of mobile executable instructions (e.g., a plug-in) that perform the actions of its corresponding component 12, as described in its corresponding model. The actions relate to the capabilities and the constraints thereon as described in the individual models. Similar to the models, each set of mobile executable instructions can be stored with its corresponding component 12, in a storage component of the system such as the storage component 14 or the like, in a storage component external to the system, etc., and the planner 10 is provided with access to each set of mobile executable instructions. Such access typically includes at least query privileges. The planner 10 can access each set of mobile executable instructions through a wire and/or wireless network, a bus, a port, a backplane, or the like. Additionally or alternatively, each set of mobile executable instructions can be provided to the planner 10 and stored within the storage component 16 where it can be accessed by the planner 10. Each set of mobile executable instructions may be capable of communicating with at least one other set of mobile executable instructions and/or model associated therewith (e.g., for determining the capabilities and constraints of another component) and/or updating the capabilities and/or constraints described in its corresponding model. For sake of brevity and clarity, FIG. 1 illustrates one or more set of mobile executable instructions 20 as stored in the storage component 14. However, as described above, the one or more set of mobile executable instructions 20 can be stored elsewhere and/or concurrently stored in multiple locations. Each set of mobile executable instructions may also occasionally communicate with the corresponding component to update itself of the latest condition of the component and adjust the way it answers different queries.

Plan construction commences upon or after receiving a job to process. Such jobs can be received by the system and conveyed to the planner 10 and/or another suitable component(s) such as a controller (not shown) or the like. As depicted at 22, in this example the planner 10 receives one or more jobs. Such jobs can be provided by various sources. For example, a job can be generated at and/or by the system itself. For instance, the system may include a user interface (not shown) with which a user create and/or initiate a job, and/or the system may be able to automatically create a job based on one or more goals. In another instance, a device (not shown) with a processing unit, such as a computer, can send a job to the system over wire and/or wireless connection. In another instance, the job can be stored on a portable storage medium (not shown) and transferred to the system. It is to be appreciated that the foregoing examples are non-limiting and are only provided for explanatory purposes.

A plan generator 24 interprets the job requirements (e.g., determines what needs to be done to complete the job) and determines which of the components 12 will be involved with implementing the plan. The plan generator 24 then begins generating a plan to process the job, based on the capabilities and capability constraints of the involved components. As incremental portions (which each include one or more actions, etc.) of the plan are constructed, a plan tester 26 queries one or more of the sets of executable instructions with proposed plans. By way of example, the plan tester 26 may query the set of mobile executable instructions corresponding to the component$_1$ with a proposed plan that includes proposed actions to be performed by the component$_1$. Each of the actions within a proposed plan can be associated with an action name and a corresponding time range with a lower and upper time bound.

Each queried set of mobile executable instructions executes the actions within the proposed plan. The mobile executable instructions can perform arbitrary and/or time-bounded computation on the proposed plan in order to determine if the proposal satisfies the constraints of the component. In one instance, the mobile executable instructions can asynchronously communicate with its corresponding component 12 to update its knowledge of the state of the component 12. This ensures the set of mobile executable instructions represents the current capabilities and constraints and reduces the chance of rejection due to unknown capabilities or constraints.

Upon executing the actions, each set of mobile executable instructions can variously respond to the plan tester 26. In one instance, the response is a confirmation that the corresponding component 12 can or cannot execute the action(s), for example, at any time within the predefined time range. Additionally or alternatively, the response can include an acceptable time range (e.g., tighter time window). The plan tester 26 can provide this information to the plan generator 24, which can use the information for subsequent plan generation. Additionally or alternatively, the response can include a cost of performing the action(s) within the time range. The cost can be associated with various characteristics such as duration, wear-and-tear, power usage, toner usage, probability of successful execution, etc. This information can be specified in each model, in each set of mobile executable instructions, and/or stored with the corresponding component 12, the storage component 14, the storage component 16, external storage, etc. In one instance, the set of mobile executable instructions for a particular component 12 can update the stored metrics and/or an expiration date. Additionally or alternatively, the response can include a substitute sequence of actions for the plan. Thus, in one instance, the executable instructions provide low-level planning, which may reduce the load on the planner 10 and increase overall system performance.

Upon generating actions that satisfy each of the components 12, the plan generator 24 can construct a final plan. In one instance, the planner 10 subsequently employs the propose/accept/confirm PAC or like protocol to confirm the final plan. Thus, the sets of mobile executable instructions provide early detection of a plan that would be rejected and possibly more accurate information about costs that could be used to guide the search. Since a PAC cycle can take hundreds of milliseconds, is desirable to capture as many constraints as possible in the planner 10 rather than relying on the PAC protocol.

Using the PAC or like protocol, the final plan is first proposed to the involved components 12. Each of these components 12 either accepts or rejects the proposed final plan. Since these components 12, through their corresponding sets of mobile executable instructions, already confirmed that the plan satisfies their constraints and that they can process the job, all of the components 12 most likely will accept the plan. However, it is possible for a final plan to be rejected. For instance, a component, a capability thereof, and/or a constraint on a capability and/or the job may have changed since the low-level confirmation attained through the sets of mobile executable instructions. In another instance, one or more of the components 12 may have subsequently failed, become inoperable, malfunctioned, received a software/firmware update, etc. Such circumstances may render the plan unachievable. If the plan fails for any reason, the planner 10 can be programmed to start the planning process over again, beginning at a stage in the planning process deemed suitable.

A confirmed final plan is provided to an execution engine 28, which executes the plan in order to process the job. Such execution includes using the involved components 12 to concurrently and/or serially execute one or more actions of the plan in order to facilitate processing the job. In one instance, the plan is associated with a single job, while in another instance the plan is associated with multiple jobs that are concurrently and/or serially processed.

The foregoing planning system allows the modeling language to be infinitely extendable, and the constraints of each of the components 12 can be known by a designer of the device rather than being anticipated by the controller designer. In addition, this system allows the model to be updated by the components 12 in a general way. For example, each set of mobile executable instructions can communicate with its component 12 using a common or component-specific protocol, as appropriate. Furthermore, this system allows the modeling language to be simpler relative to the modeling language used with conventional planners. This means the planner 10 can be simpler and faster, and the updates of the model can be simpler and faster (e.g., the executable instructions can receive their updates in parallel.) Moreover, the system is compatible with conventional systems. For instance, in a relatively simple case, the modeling language could provide a "null plug-in" so that a set of mobile executable instructions always accepts proposed plans.

Figure 2:
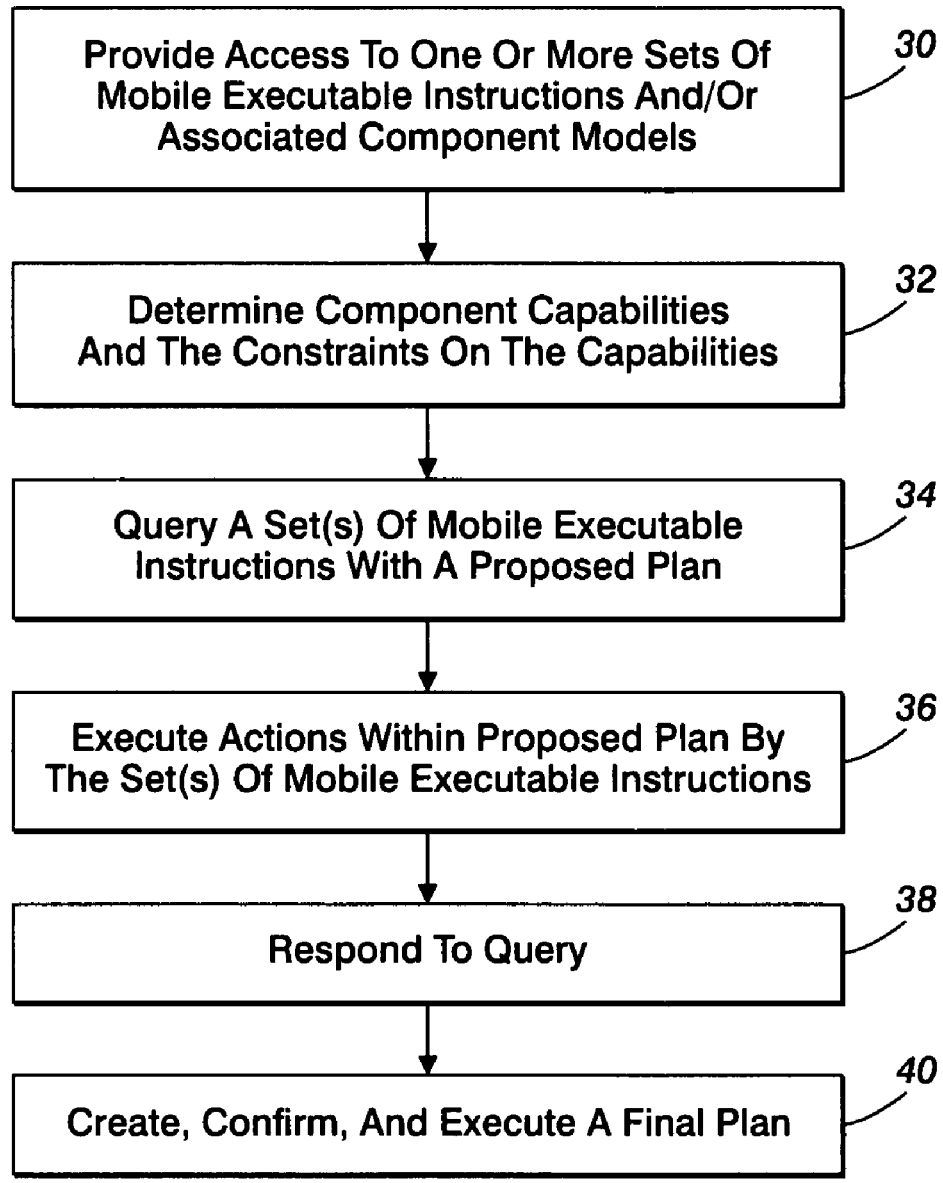
FIG. 2 illustrates an exemplary method for generating and confirming a plan for processing a job, based on the capabilities and constraints on the components that will be implementing the plan.

FIG. 2 illustrates a method for generating and confirming a plan for processing a job, based on the capabilities and constraints on the components that will be implementing the plan. At reference numeral 30, a set of mobile executable instructions is made accessible by each of a plurality of components of a system. For instance, each set of mobile executable instructions can at least be queried. Each set of the mobile executable instructions performs one or more actions of its corresponding component. Such actions are typically defined within a model that describes its components capabilities and constraints such capabilities. Optionally, access to the models is also provided. Either or both of the sets of mobile executable instructions and the models can be variously stored, for example, with its corresponding component, system storage, planner storage, external storage, etc.

At 32, the capabilities and constraints of each of the components are ascertained from corresponding models. These capabilities and constraints are used to facilitate generating a plan for processing a job. At 34, one or more sets of the mobile executable instructions are queried with proposed plans. Such plans include actions that will be performed by corresponding components in order to execute the plan. Each proposed plan may also include an action name and/or a corresponding time range (with a lower and upper time bound) in which the action is to be performed. At 36, each queried set of mobile executable instructions executes the actions within its proposed plan. The executable instructions can perform arbitrary and/or time-bounded computation to determine if the proposal satisfies the constraints of the component. Each set of mobile executable instructions can communicate with its corresponding component to updates its knowledge of the state of its corresponding component.

At 38, each set of mobile executable instructions responds to its query. Suitable responses include one or more of the following: a confirmation that the component can execute an action at any time within the predefined time range; an indication that the component cannot execute an action in the proposed plan; an acceptable time range for an action; a cost of performing an action within the time range, and a substitute sequence of actions that can be processed by the component, as well as other responses. Upon generating actions that satisfy the components, at 40, a final plan is constructed. The final plan is confirmed and used to process the job. In one instance, a PAC or like technique is used to confirm the final plan as described in detail above. With such technique, the final plan is first proposed to the components that will be involved in processing the job. Each of these components either accepts or rejects the proposed final plan. Upon acceptance, the plan can be used to process the job. If the plan is rejected, the planner can create another plan.

Figure 3:
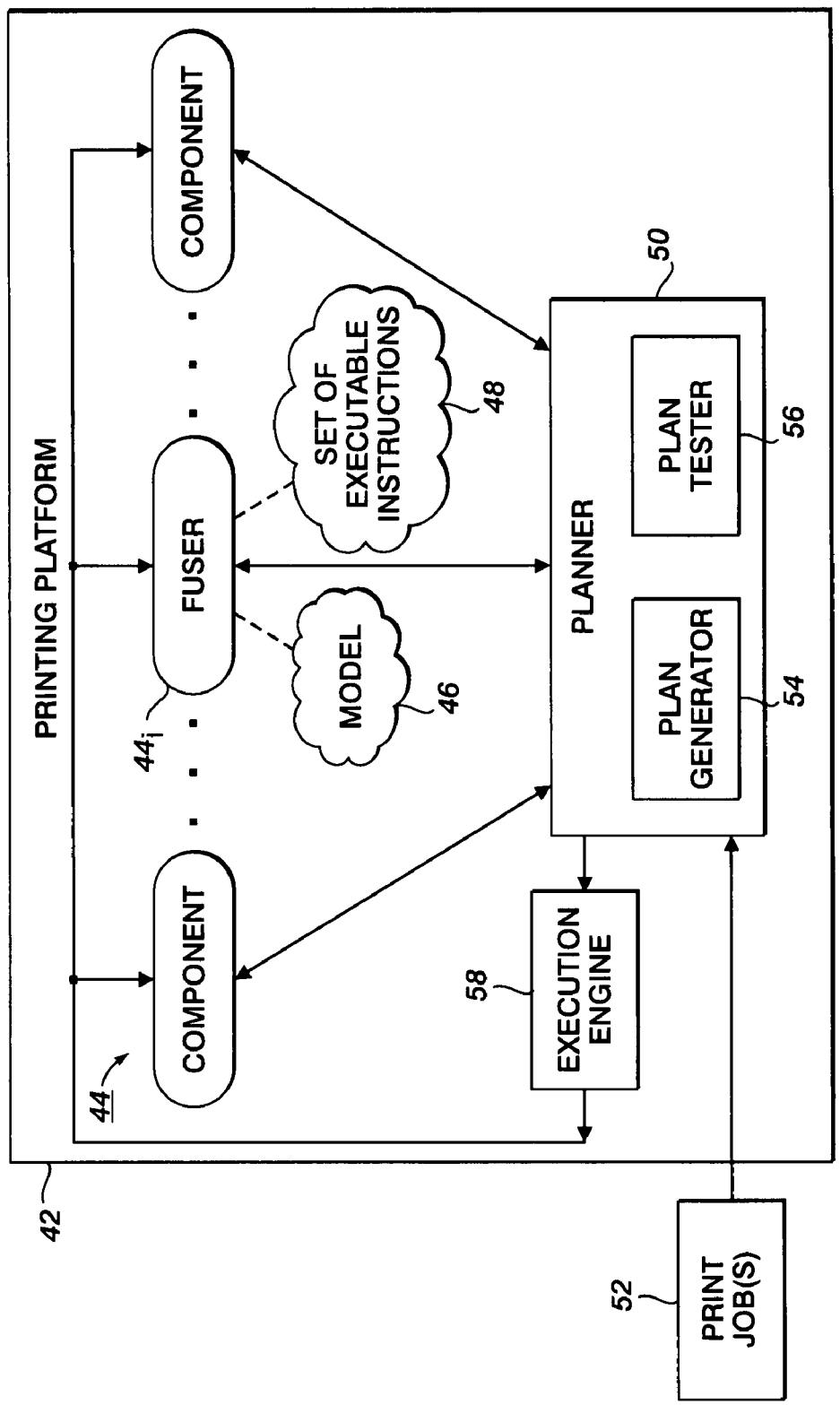
FIG. 3 illustrates an example of a print platform using the planner to facilitate generating plans to process jobs.

FIG. 3 provides a non-limiting example of a system that may use the techniques described herein to generate plans for processing jobs. In this example, the system is a printing platform 42 that includes a plurality of components 44 such as one or more print medium feeders, cleaners, chargers, exposure mechanisms, fusers, finishers, transfer elements, photoreceptors, developers, output trays, etc., as well as other xerographic components. Each of these components has particular capabilities, which are associated with constraints. By way of non-limiting example, a fuser $44_i$ may be capable of fusing print medium processed by different development systems of the printing platform 42 that use different toners (e.g., color, low gloss black, high gloss black, magnetic, etc.). In this instance, the fuser $44_i$ may use a common configuration (regardless of the particular type of toner used) or multiple toner-specific configurations (e.g., with different set points that take into account toner melting temperature and/or other toner characteristics). A particular constraint on such a system may be a fuser warm-up time. The other components of the printing platform 42 are also associated with various capabilities and constraints. However, for sake of brevity, the fuser $44_i$ will be used throughout this example.

Each of the components 44 is associated with a model that describes its capabilities and constraints thereon. For example, the fuser $44_i$ is associated with a model 46 that indicates its fusing capabilities and warm-up time constraint. Each of the components 44 is also associated with mobile executable instructions that can perform the actions of its corresponding component. For example, the fuser $44_i$ is associated with an executable instruction component 48. The actions relate to the capabilities and the constraints described in the model 46. Each of the components 44 may convey its associated executable instructions and/or associated model to the planner 10 or provide access thereto to the planner 10.

Thus, the fuser $44_i$ can provide the model 46 and/or the executable instruction component 48 to a planner 50 (which can be substantially similar to the planner 10) and/or allow the planner 50 to access the model 46 and/or the executable instruction component 48 wherever they may reside (e.g., within the fuser $44_i$, in resident memory, in external memory, etc.).

The planner 50 can access the models and determine the capabilities and constraints of the components. For example, the planner 50 can access the model 46 and determines the capabilities and constraints of the fuser $44_i$. The planner 50 uses these capabilities and constraints when generating the fusing portion of a plan for a job, such as one or more print jobs 52. A plan generator 54 (which can be substantially similar to the plan generator 24) generates the plan based on the components that will process the job the capabilities and constraints of these components. As described above, as various portions of the plan are constructed, a plan tester 56 (which can be substantially similar to the plan tester 26) queries appropriate sets of executable instructions with a proposed plan. For example, the plan tester 56 can query the executable instructions component 48 with actions to be performed by the fuser $44_i$.

The queried executable instructions execute the actions within the proposed plan. As noted previously, the executable instructions can perform arbitrary and/or but time-bounded computation to determine if the proposal satisfies the constraints of the component. Using the above example, this may involve determining whether the job(s) 52 includes a fuser warm up time within the range of the warm up time of the fuser $44_i$. Upon executing the actions, each set of executable instructions can variously respond to the plan tester 56. Suitable responses include, but are not limited to, one or more of the following: a confirmation that the component (e.g., the fuser $44_i$) can execute an action (e.g., fusing the image to the print medium) at any time within the predefined time range; an indication that the component cannot execute an action in the proposed plan; an alternative acceptable time range for an action; a cost of performing an action within the time range, and a substitute sequence of actions that can be processed by the component, as well as other responses.

Upon generating actions that satisfy the components, a final plan is constructed and confirmed using a PAC or like technique as described above. The confirmed final plan is provided to an execution engine 58, which executes the plan in order to process the print job.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for planning machine control for a system, comprising:

determining one or more capabilities and one or more capability constraints for each component used to execute a plan for processing a job by the system;

incrementally constructing an initial plan based on the components, the one or more capabilities, and the one or more constraints;

querying sets of mobile executable instructions with incremental portions of the initial plan, each set of mobile executable instructions is associated with a different one of the components and represents the actions that are performed by its corresponding component, each incremental portion includes actions that are to be performed by its corresponding component, and each set of mobile executable instructions executes the incremental portion it received; and generating a final plan upon receiving a confirmation from each of the queried sets of mobile executable instructions that indicates each of the components is able to perform the actions in the incremental portions.

2. The method as set forth in claim 1, further including confirming the final plan through a propose/accept/confirm (PAC) technique.

3. The method as set forth in claim 2, further including executing the final plan to process the job.

4. The method as set forth in claim 1, further including receiving a response from each queried set of mobile executable instructions, wherein each response includes one of more of the following:
   a confirmation that its corresponding component is able to execute the actions within the incremental portion of the plan at any time and within a predefined time range;
   an indication that its corresponding component is unable to execute the actions in the incremental portion of the plan;
   an acceptable time range for each of the actions in the incremental portion of the plan;
   a cost of performing each of the actions in the incremental portion of the plan within the predetermined time range, and
   a substitute sequence of actions.

5. The method as set forth in claim 1, further including receiving a model for each of the components, wherein each model describes the one or more capabilities and the one or more constraints of its corresponding component.

6. The method as set forth in claim 5, further including using a set of mobile executable instructions to update the capabilities and constraints described within its corresponding model.

7. The method as set forth in claim 5, wherein each set of mobile executable instructions communicates with its corresponding model to update its knowledge of a current state of its corresponding component.

8. The method as set forth in claim 5, further including accessing the model through one or more of a network, a bus, a backplane, and a port.

9. The method as set forth in claim 1, wherein the query is transmitted through one or more of a network, a bus, a backplane, and a port.

10. The method as set forth in claim 1, wherein each set of mobile executable instructions resides with its corresponding component or is mobile and is transferred to another component.

11. The method as set forth in claim 1, wherein each set of mobile executable instructions is queried through one of a network, a bus, a backplane, and a port.

12. The method as set forth in claim 1, wherein each set of mobile executable instructions performs arbitrary and time-bounded computation on the incremental plan to determine if the actions within the plan satisfy the constraints of the component.

13. A system that plans machine control, comprising:
   a planner that receives a job to process;
   a plan generator that incrementally generates a plan to process the job based on one or more capabilities of one or more components of the system used to implement the plan and one or more constraints on the one or more capabilities; and
   a plan tester that queries a set of executable instructions associated with each of the components, wherein the query comprises an incremental portion of the plan that includes actions to be performed by the corresponding components, each set of executable instructions represents the capabilities and the constraints thereon of the corresponding components; the set of executable instructions executes the actions within the incremental portion of the plan, and the plan generator generates a final plan when each set of executable instructions confirms that its corresponding component is able to perform the actions.

14. The system as set forth in claim 13, wherein each incremental portion of the plan includes an action name for each action and a time range in which each action is to be performed.

15. The system as set forth in claim 13, wherein each set of executable instructions responds to a query with one of more of the following responses: a confirmation that its corresponding component is able to execute the actions within the incremental portion of the plan at any time and within a predefined time range; an indication that its corresponding component is unable to execute the actions in the incremental portion of the plan; an acceptable time range for each of the actions in the incremental portion of the plan; a cost of performing each of the actions in the incremental portion of the plan within the predetermined time range, and a substitute sequence of actions.

16. The system as set forth in claim 13, wherein the system is one of a multifunctional print platform and a manufacturing system.

17. The system as set forth in claim 13, wherein the planner confirms the final plan through a propose/accept/confirm (PAC) technique, and further including an execution engine that executes the final plan.

18. The system as set forth in claim 13, wherein the executable instructions are mobile executable instructions, and wherein the plan tester queries each set of mobile executable instructions through one of a network, a bus, a backplane, and a port.

19. The system as set forth in claim 13, wherein the executable instructions are mobile executable instructions, and wherein each set of mobile executable instructions performs arbitrary and time-bounded computation on the incremental plan to determine if the actions within the incremental plan satisfy the constraints of its corresponding component.

20. A print platform, comprising:
   one or more xerographic components that execute plans to process jobs;
   a planner that receives a print job to process;
   a plan generator that incrementally generates a plan to process the job based on one or more capabilities of one or more components of the system used to implement the plan and one or more constraints on the one or more capabilities;
   a plan tester that queries a set of executable instructions associated with each of the components with an incremental portion of the plan that includes actions to be performed by the corresponding components, each set of executable instructions represents the capabilities and the constraints thereon of the corresponding components; the set of executable instructions executes the actions within the incremental portion of the plan, and the plan generator generates a final plan when each set of executable instructions confirms that its corresponding component is able to perform the actions; and
   an execution engine that executes the final plan.

* * * * *